: US 7,561,397 B2
: Jul. 14, 2009

(12) United States Patent
Liang et al.

(54) LIMITED CURRENT CIRCUIT FOR ELECTRO-LUMINESCENT LAMP INVERTER

(75) Inventors: Chih-Ping Liang, Hsinchu (TW); Chang-Yi Liu, Changhua County (TW); En-Ming Wu, Taipei (TW)

(73) Assignee: RightLite LLC, Colmar, PA (US)

( * ) Notice: Subject to any disclaimer, the term of this patent is extended or adjusted under 35 U.S.C. 154(b) by 0 days.

(21) Appl. No.: 11/727,274

(22) Filed: Mar. 26, 2007

(65) Prior Publication Data

US 2007/0228989 A1    Oct. 4, 2007

Related U.S. Application Data

(60) Provisional application No. 60/787,534, filed on Mar. 31, 2006.

(51) Int. Cl.
*H02H 9/08* (2006.01)
*G09G 5/00* (2006.01)

(52) U.S. Cl. ............ 361/93.9; 361/93.7; 361/93.5; 361/91.2; 361/91.1; 345/177; 345/174; 345/173; 345/176

(58) Field of Classification Search ............ 361/1, 361/5–8, 17, 18–22, 38–42, 136, 170, 435, 361/15, 90, 91.1, 91.2, 93.1, 93.5, 93.7, 93.9, 361/88; 345/173, 174, 175, 176, 177
See application file for complete search history.

(56) References Cited

U.S. PATENT DOCUMENTS

| | | | | | |
|---|---|---|---|---|---|
| 5,638,092 | A | * | 6/1997 | Eng et al. | 345/158 |
| 6,262,565 | B1 | * | 7/2001 | Williams et al. | 323/237 |
| 6,354,508 | B1 | * | 3/2002 | Fogh et al. | 236/78 R |
| 7,312,583 | B2 | * | 12/2007 | Kim et al. | 315/212 |
| 2006/0055679 | A1 | * | 3/2006 | Grinshpoon et al. | 345/173 |
| 2006/0087262 | A1 | * | 4/2006 | Kim et al. | 315/312 |
| 2007/0247085 | A1 | * | 10/2007 | Yao et al. | 315/291 |

\* cited by examiner

*Primary Examiner*—Tuyet Vo
(74) *Attorney, Agent, or Firm*—Connolly Bove Lodge & Hutz LLP

(57) ABSTRACT

A current limiting device includes a constant current source circuit constructed and arranged to be connected to a direct current input voltage source and to regulate electrical current and a resonance source circuit receiving current from the constant current source circuit. The resonance source circuit is constructed and arranged to be electrically connected with an electro-luminescent (EL) lamp so that the EL lamp receives alternating current. The constant current source circuit and the resonance source circuit are constructed and arranged such that when current flows from the constant current source circuit to the resonance source circuit and to the EL lamp, a maximum peak current received by a user contacting an output of the device or contacting the EL lamp is less than about 0.7 mA.

4 Claims, 1 Drawing Sheet

LIMITED CURRENT CIRCUIT FOR ELECTRO-LUMINESCENT LAMP INVERTER

This application claims the benefit of the earlier filing date of U.S. Provisional Application No. 60/787,534, filed on Mar. 31, 2006 which is incorporated by reference herein in its entirety.

FIELD OF THE INVENTION

The invention relates to electro-luminescent (EL) lamps and, more particularly, to a circuit for limiting current of an EL inverter to prevent or reduce electrical shock to a user.

BACKGROUND OF THE INVENTION

The use of electro-luminescent (EL) panels, particularly in portable electronic derives such as keyboards of laptop and desktop computers, requires meeting various standard safety tests. In order to produce a high level of backlighting, a high peak to peak voltage is necessary. To avoid electrical shock, organizations like UL (Underwriters Laboratories), require that the inverter, used to power the EL panel(s), provides the power necessary such that the clearance and creepage distance between the high voltage output of the EL panel and its surroundings (enclosure, printed circuit board and connector) do not create a hazardous condition (UL 60950). The requirement of a safety space usually needs 4-8 mm. For portable and lightweight devices where space is at a premium, it is difficult to meet such standards. The alternative method to meet such standard is to provide limited current circuit (LCC) in the inverter. The equivalent impendence of a human body is about 2000 ohms. For a 2000 ohm load between outputs or output to ground, a maximum peak current flow should not exceed 0.7 mA.

Conventional single ended autotransformer type inverters inhibit the oscillation as the output load is shorted, but do not take a 2000 ohm load into account. Such an inverter would protect itself from an output short circuit, but would not prevent an electrical shock to the human body upon contact with the output of the inverter under normal conditions.

Thus, there is a need to provide an inverter circuit with capability to limit current such that a maximum peak current flow to ground does not exceed 0.7 mA.

SUMMARY OF THE INVENTION

An object of the invention is to fulfill the need referred to above. In accordance with the principles of the present invention, this objective is obtained by providing a limited current circuit (LCC) within an inverter of an EL lamp to prevent or limit the above-mentioned electrical hazard. Thus, the LCC is configured so that when a human body or a similar resistance (2000 ohm) touches the output of the inverter or touches the EL lamp under normal conditions, there is a maximum peak current flow to ground. Present UL requirements specify this at not exceeding 0.7 mA.

Thus, a current limiting device is provided that includes current source circuit constructed and arranged to be connected to a direct current input voltage source and to regulate electrical current and a resonance source circuit receiving current from the current source circuit. The resonance source circuit is constructed and arranged to be electrically connected with an electro-luminescent (EL) lamp so that the EL lamp receives alternating current. The current source circuit and the resonance source circuit are constructed and arranged such that when current flows from the current source circuit to the resonance source circuit and to the EL lamp, a maximum peak current received by a user contacting an output of the device or contacting the EL lamp is less than about 0.7 mA.

In accordance with another aspect of the invention, a method of limiting current of an inverter associated with an electro-luminescent (EL) lamp is provided. The method provides an inverter constructed and arranged to convert Direct Current input voltage to an Alternating Current output voltage to power an EL lamp. A current limiting circuit is provided within the inverter. The method ensures that when the EL lamp is powered by the inverter, the current limiting circuit limits a maximum peak current received by a user contacting an output of the inverter or contacting the EL lamp to less than about 0.7 mA.

In accordance with yet another aspect of the invention, a method of compensating for decay of an electro-luminescent (EL) lamp provides an inverter including a constant current limiting circuit constructed and arranged to be connected to a direct current input voltage source and to regulate electrical current. The inverter also includes a resonance source circuit receiving an output voltage from the constant current source circuit. The resonance source circuit provides an alternating current output voltage to the EL lamp. As the EL lamp ages, the output voltage from the constant current source circuit is increased, thus increasing the output voltage from the resonance source circuit, thereby compensating for a decay of the EL lamp.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWING

The invention will be better understood from the following detailed description of the preferred embodiments thereof, taken in conjunction with the accompanying drawing in which.

DESCRIPTION OF THE EXEMPLARY EMBODIMENT

Figure 1:
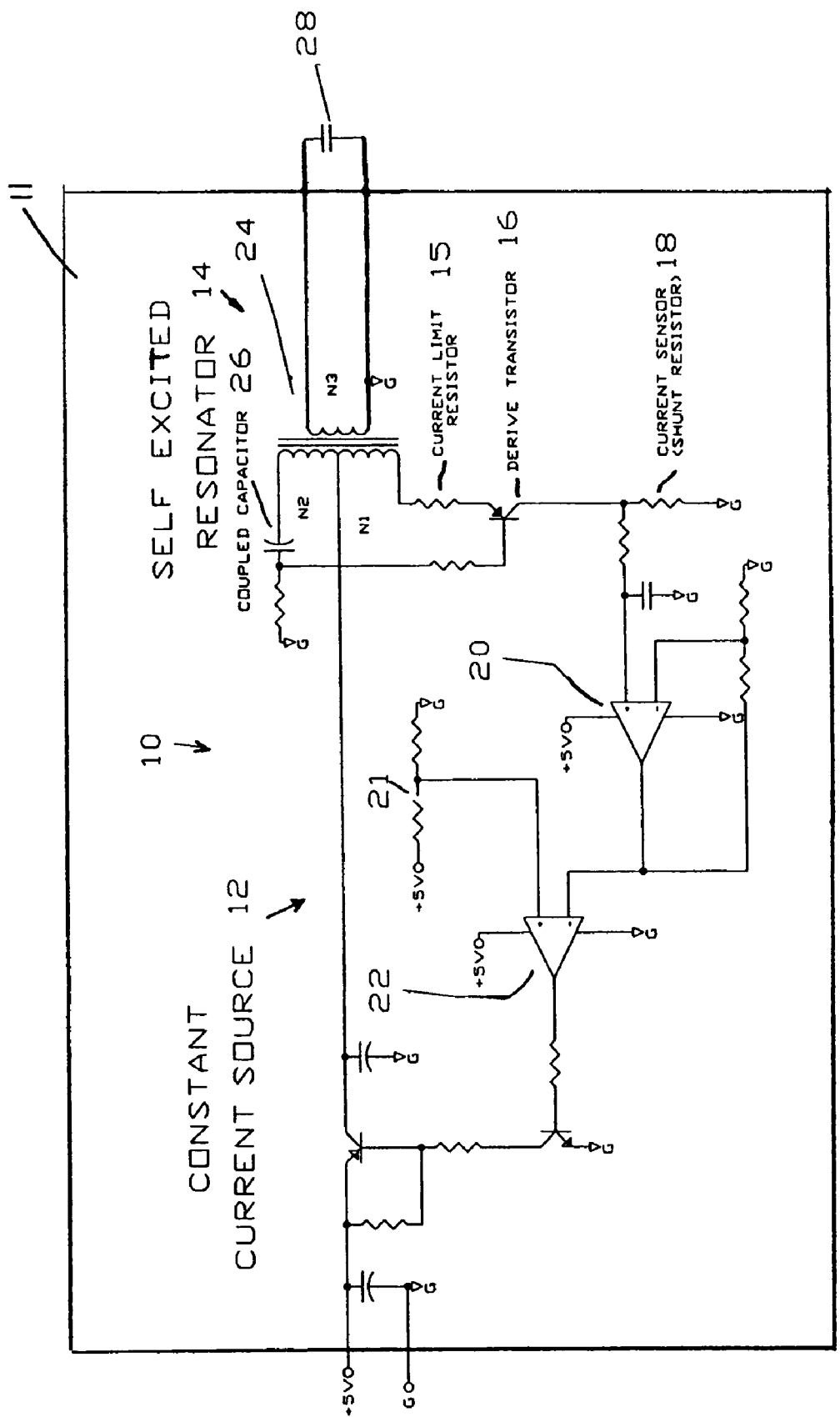
FIG. 1 is a schematic of a current limiting device for an inverter of an EL lamp, provided in accordance with the principles of the invention.

With reference to FIG. 1, a limited current circuit (LCC) device for an inverter of an EL lamp is shown, generally indicated at 10, in accordance with the principles of the present invention. The LCC device 10 includes a constant current source circuit, generally indicated at 12, and transformer resonance source circuit, generally indicated at 14. The LCC 10 is part of a conventional inverter 11 for an EL lamp 28. The inverter 11 converts DC voltage to AC voltage (preferably 50-80 Vrms) and frequency (preferably 250-1000 Hz) for operating the AC powered EL lamp 28.

The constant current source circuit 12 is a linear transistor pass type regulator. In order to reduce a drop voltage of a transistor 16, a PNP type transistor is used. The emitter is connected to the inverter input voltage source (which is typically 5.0 or 3.3V DC). A current sensor 18 is connected with the collector of the transistor 16. The sensor 18 is preferably in the form of a small resistance shunt (preferably 0.2 ohm) that is also intended to reduce the drop voltage. An operational amplifier 20 is connected to the shunt resistor 18 to amplify the pass current. A reference voltage is established from a resistance divider 21 connected to the positive input of another operational amplifier 22. The negative input of amplifier 22 is connected to the output of amplifier 20. The base of transistor 16 is then connected to the output of operational amplifier 22 to complete a constant current feedback loop.

The resonance source circuit 14 includes a transformer 24 having three sections or phases for resonance windings. N1 is connected to the output of the constant current source circuit 12, current limiting resistor 15 and the PNP derive transistor 16. N2 is a step-up winding on N1 which is coupled to the base circuit through a capacitor 26. N3 is a separate winding connected to the EL lamp 28 and output ground.

When an EL panel or lamp 28 is provided power and/or is lit, power from the constant current source circuit 12 flows to the transformer 24 and feedback winding N2 forces the derive transistor 16 to switch on and off. The coupled voltage on the N3 winding will resonate with the EL lamp receiving the AC output. When a user such as a human body (or similar resistance) touches the high voltage output of the inverter containing the LCC 10 (or touches the EL panel or lamp 28), the oscillation is substantially detuned and insufficient energy is then fed through the capacitor 26 into the base of transistor 16. The base current of the derive transistor 16 will keep the Direct Current (DC) at a constant value. The constant current source circuit 12 limits the current flow into winding N1 and the derive transistor 16. The current limiting resistor 15 has also a voltage drop, and the emitter voltage of transistor 16 will then drop so that the oscillation stops. Since N3 is a separate winding, the current will not draw from the constant current source circuit 12 to the human body (or similar resistance). Experimentally, this approach shows the peak current is significantly below UL's current requirements of 0.7 mA and is typically about 0.2 mA.

The LCC 10 can be employed in a circuit or an integrated circuit and/or partially embedded in a semiconductor chip.

Thus, the LCC 10 can be controlled to levels below the threshold mandated by UL and enables keyboards and keypads for computer and related products to be backlit with EL panels and substantially achieve UL certifications, and Conformité Européenne (CE) certifications for Europe. The LCC 10 can be controlled to levels below the threshold mandated by UL and enable keyboards and keypads for computer and related products to be backlit with EL panels and substantially achieve computer related safety certifications like Certification Body (CB). Control of the LCC 10 provides a much safer backlit environment for EL based products, and control of the LCC 10 enables EL products to be used into applications where previously they were unacceptable.

Another feature of LCC is the fact that it is a constant power source to the derive EL lamp 28. The life as derived by a constant power source is much longer than a constant voltage source. As the EL lamp 28 ages, its capacitance will increase. Since the autotransformer type inverter has a constant output voltage to the derive EL lamp 28, the current fed into the resonance circuit 14 and to the EL lamp 28 will decrease, resulting in poor life. In order to maintain constant current flow from the current source 12, the output voltage of the amplifier 22 will increase and reduce the base current of the pass transistor in the current source 12. The enhanced conduction of the pass transistor generates a higher output voltage of the pass transistor. The increased input voltage to the resonance circuit 14 increases the output voltage to EL lamp 28. The brightness of the EL lamp depends on the magnitude of applied voltage. Thus, the (brightness) decay of the EL lamp 28 can be compensated to extend the life of the EL lamp 28.

Furthermore, since the EL lamp 28 is powered by the inverter 11, adjusting the setting of the current of the constant current source 12 can dim the output of the inverter 11.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A current limiting device comprising:
   a constant current source circuit constructed and arranged to be connected to a direct current input voltage source and to regulate electrical current, and
   a resonance source circuit receiving current from the current source circuit and being constructed and arranged to be electrically connected with an electroluminescent (EL) lamp so as to receive alternating current,
   wherein the constant current source circuit and the resonance source circuit are constructed and arranged such that when current flows from the current source circuit to the resonance source circuit and to the EL lamp, a maximum peak current received by a user contacting an output of the device or contacting the EL lamp is less than about 0.7 mA,
   wherein the constant current source circuit includes a transistor, an emitter of the transistor is connected to the input voltage source, a current sensor is connected to a collector of the transistor, a first amplifier is connected with the current sensor to amplify a pass current, a resistance divider, establishing a reference voltage, is connected to a positive input of a second amplifier, a negative input of the second amplifier being connected to an output of the first amplifier, a base of the transistor is connected to an output of the second amplifier to complete a constant current feedback loop defined by the current source circuit.

2. The device of claim 1, wherein the resonance source circuit includes a three phase transformer, a first phase is connected to an output of the current source circuit, a current limiting resistor and the emitter of the transistor, a second phase is coupled to the base of the transistor though a capacitor, and the third phase is a separate winding constructed and arranged to be electrically connected to the EL lamp and output ground.

3. A current limiting device comprising:
   means, constructed and arranged to be connected to a direct current input voltage source, for regulating electrical current, and
   means, receiving current from the means for regulating, for electrically connecting with an electroluminescent (EL) lamp so that the EL lamp receives alternating current,
   wherein the means for regulating and the means for electrically connecting are constructed and arranged such that when current flows from the means for regulating to the means for electrically connecting and to the EL lamp, a maximum peak current received by a user contacting an output of the device or contacting the EL lamp is less than about 0.7 mA,
   wherein the means for regulating is a constant current source circuit including a transistor, an emitter of the transistor is connected to the input voltage source, a current sensor is connected to a collector of the transistor, a first amplifier is connected with the current sensor to amplify a pass current, a resistance divider, establishing a reference voltage, is connected to a positive input of a second amplifier, a negative input of the second amplifier being connected to an output of the first amplifier, a base of the transistor is connected to an output of the second amplifier to complete a constant current feedback loop defined by the constant current source circuit.

4. The device of claim 3, wherein the means for electrically connecting includes a three phase transformer, a first phase is connected to an output of the current source circuit, a current limiting resistor and the emitter of the transistor, a second phase is coupled to the base of the transistor through a capacitor, and the third phase is a separate winding constructed and arranged to be electrically connected to the EL lamp and output ground.

\* \* \* \* \*